(12) United States Patent
Hoxmeier

(10) Patent No.: US 6,331,589 B1
(45) Date of Patent: Dec. 18, 2001

(54) ORGANIC POLYMERS CONTAINING POLYETHYLENE OR POLYSTYRENE POLYSILOXANE DIBLOCK COPOLYMERS AS MELT PROCESSING AIDS

(75) Inventor: Ronald James Hoxmeier, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 09/442,220

(22) Filed: Nov. 17, 1999

Related U.S. Application Data

(60) Provisional application No. 60/109,778, filed on Nov. 25, 1998.

(51) Int. Cl.⁷ .................................................. C08G 77/442
(52) U.S. Cl. .................... 525/54.3; 525/92 R; 525/92 B; 525/92 E; 525/92 F; 525/90; 525/91
(58) Field of Search ............................... 525/92 R, 92 G, 525/90, 91, 54.3, 92 B, 92 E, 92 F

(56) References Cited

U.S. PATENT DOCUMENTS

| | | |
|---|---|---|
| 3,691,257 | 9/1972 | Kendrick et al. . |
| 4,822,674 | 4/1989 | Malhotra et al. .................... 428/336 |

FOREIGN PATENT DOCUMENTS

3210693 A   3/1982   (DE) .

Primary Examiner—Jeffrey Mullis

(57) ABSTRACT

The present invention provides organic polymers and compounds containing such polymers which have enhanced melt processing characteristics. A composition of the present invention includes at least one organic polymer and from 0.1 percent by weight to 5 percent by weight of a diblock copolymer of polystyrene and a polysiloxane or polyethylene and a polysiloxane. The overall weight average molecular weight of the diblock copolymer ranges from 500 to 50,000. The polysiloxane content of the block copolymer is from 20 to 90 percent by weight. The organic polymer incorporating the above-described melt processing aid can be incorporated into a compound of the organic polymer and another polymer and/or an oil and/or a filler material. Preferably, the composition includes two different organic polymers, especially including a block copolymer.

14 Claims, No Drawings

ORGANIC POLYMERS CONTAINING POLYETHYLENE OR POLYSTYRENE POLYSILOXANE DIBLOCK COPOLYMERS AS MELT PROCESSING AIDS

This application claims the benefit of U.S. Provisional Application No. 60/109,778, filed Nov. 25, 1998, the entire disclosure of which is hereby incorporated by reference.

FIELD OF THE INVENTION

This invention relates to compositions comprising organic polymers and diblock copolymers of polyethylene or polystyrene and a polysiloxane such as polydimethylsiloxane which are incorporated as melt processing aids.

BACKGROUND OF THE INVENTION

It has long been known that organo polysiloxanes may be incorporated into organic polymer compositions to modify the processing characteristics thereof. For example, it is known that extrudability and calendering of such materials may be improved by incorporating therein liquid dimethylpolysiloxanes. U.S. Pat. No. 3,691,257 describes the addition of polystyrene-polydimethylsiloxane-polystyrene triblock copolymers to organic polymers in order to beneficially modify the surface properties of organic polymers and compositions containing them.

SUMMARY OF THE INVENTION

The present invention provides organic polymers and compounds containing such polymers which have enhanced melt processing characteristics. A composition of the present invention includes at least one organic polymer and from 0.1 percent by weight to 5, preferably 0.5 to 3.0, percent by weight of a diblock copolymer of polystyrene and a polysiloxane or polyethylene and a polysiloxane. The copolymers of this invention should have a polysiloxane content of from 20 to 90, preferably 40 to 75, percent by weight. The overall weight average molecular weight of the diblock copolymer ranges from 500 to 50,000, preferably 1000 to 25,000. The weight average molecular weight of the polydimethylsiloxane block may range from 500 to 40,000. The weight average molecular weight of the polyethylene block may range from 500 to 10,000 and the weight average molecular weight of the polystyrene block may range from 4000 to 30,000.

The organic polymer incorporating the above-described melt processing aid can be incorporated into a compound of the organic polymer and another polymer and/or an oil and/or a filler material. For example, block copolymers of styrene and butadiene or isoprene may constitute the organic polymer of the compound wherein the other polymeric material may be polypropylene, polyethylene, ethylene/propylene copolymers, and polystyrene, and the composition may or may not include oil or a filler material. Such compositions may contain 100 parts by weight of one organic polymer, 8 to 50 parts by weight of a second organic polymer, and 20 to 200 parts of an oil.

DETAILED DESCRIPTION OF THE INVENTION

The melt processing aids of this invention may be used to advantage with a wide variety of organic polymers and compounds containing those polymers. The organic polymer of the present invention may comprise any organic polymer or composition containing an organic polymer which is susceptible to the incorporation therein of the diblock copolymers of the present invention. The organic polymer may, for example, be a thermoplastic such as polyolefins (for example polyethylene, polypropylene, polybutylene, copolymers of ethylene and propylene or other alpha olefins such as butylene, hexane, octene, etc.) polyamides, polyethylene-terphthalate, polyvinylchloride, polyvinylidenechloride, polystyrene, and polymethylmethacrylate, an organic rubber, for example natural rubber, polyisoprene, butadiene-styrene copolymer, butadiene-acrylonitrile copolymer, polycarbonate, polyacetal, polyphenylene sulfide, cyclo-olefin copolymers, styrene-acrylonitrile copolymer, ABS, styrene-maleic anhydride copolymers, chloroprene polymers, and isobutylene polymers, and cellulosic compounds such as cellulose acetate and cellulosic butyrate.

The most highly preferred organic polymers for use herein are block copolymers of a vinyl aromatic hydrocarbon such as styrene and a conjugated diene such as butadiene or isoprene, particularly triblock copolymers such as polystyrene-polybutadiene-polystyrene or polystyrene-polyisoprene-polystyrene. These polymers may be hydrogenated or unhydrogenated. Other preferred polymers for use herein are polyolefin polymers made using metallocene catalysts including ethylene-octene copolymers (such as Affinity® polymers made by Dow and Engage® polymers made by Dupont-Dow) ethylene-hexene copolymers, and ethylene-butene copolymers (such as Exact® polymers made by Exxon).

Polysiloxane block copolymers and methods of making them are fully described in U.S. Pat. No. 5,618,903, which is herein incorporated by reference. In block copolymerization of linear polystyrene-polydimethylsiloxane polymers, for example, polystyrene is produced by anionic polymerization with an organo lithium initiator and the living polymer (PS–Li+) created thereby is reacted with hexamethylcyclotrisiloxane, $(Me_2SiO)_3$, in the presence of a polar promoter wherein a block of polydimethylsiloxane grows on the end of the living vinyl aromatic hydrocarbon polymer block.

In general, when solution anionic techniques are used, polymers of anionically polymerizable monomers are prepared by contacting the monomer to be polymerized simultaneously or sequentially with an anionic polymerization initiator such as Group IA metals, their alkyls, amides, silanolates, naphthalides, biphenyls and anthracenyl derivatives. It is preferable to use an organo alkali metal (such as sodium or potassium) compound in a suitable solvent at a temperature within the range from –150° C. to 300° C. preferably at a temperature within the range from 0° C. to 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to 20 carbon atoms; and n is an integer of 1–4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

Ethylene may be polymerized as described above with the addition that it is usually best to include a promoter, such as a diamine, to facilitate the reaction. Examples of these amines which include but are not limited to follow: N,N,N',N'-tetramethylmethylenediamine (TMMDA), N,N,N',N'-tetramethylethylenediamine (TMEDA), N,N,N',N'-tetraethylethylenediamine (TEEDA), N,N,N',N'-tetramethyl-1,3-propanediamine (TMPDA), N,N,N',N' tetra-methyl-1,4-butanediamine (TMBDA), dipiperidinomethane (DIPIM), 1,2dipiperidinoethane (DIPIE), 1,8-bis(dimethylamino)naphthalene, N,N,N',N' tetramethyl-o-phenylenediamine (TMOPDA), 1,2-dipyrolidinoethane (DIPIP), 1,3dipiperidinopropane (DIPIP), 1,2-bis(2.6-dimethylpiperidino)cyclohexane (BDMPC), sparteine, and the like.

The ethylene polymerization reaction can be carried out at 0° C. to 100° C. preferably 25° C. to 60° C. The ethylene pressure can be from 10 psig to 1000 psig, preferably 100 to 500 psig, The polymerization time can run from 10 minutes to 2 hours, preferably 30 minutes to 1 hour.

When the polymerization of the ethylene is complete, living polyethylene blocks are present in the polymerization mixture. These are perfectly linear polyethylene-alkyllithiums. These living polyethylenes can then be reacted isoprene or styrene or with cyclic siloxane monomers including those of the formula $(R_1R_2SiO)_n$, where n=3–10, $R_1$ and $R_2$=alkyl ($C_1$–$C_{20}$), alkenyl ($C_2$–$C_{20}$), hydrogen, benzyl or phenyl (including alkyl substituted aromatics and polycyclics) and $R_1$ and $R_2$ can be the same or different. Specific siloxane monomers include $(Me_2SiO)_3$, $(MeHSiO)_3$, $(Me_2SiO)_4$, $(Me_2SiO)_5$, $(MeHSiO)_4$, $(MeHSiO)_5$, $(Ph_2SiO)_3$, $(Ph_2SiO)_4$, $(Ph_2SiO)_5$, $(PhHSiO)_4$, $(PhHSiO)_5$, $(PhHSiO)_3$, $(vinylmethylSiO)_4$, $(vinylmethylSiO)_5$, $(vinylHSiO)_3$, $(vinylHSiO)_4$, $(vinylHSiO)_5$, $(vinylmethylSiO)_3$, $(PhMeSiO)_3$, $(PhMeSi)_4$, $(PhMeSiO)_5$. Mixtures of monomers can also be used. When a polydimethylsiloxane block is desired with RLi initiator, the monomer is preferably hexamethylcyclotrisiloxane (D3) or octamethylcyclotetra-siloxane (D4).

This polymerization is carried out in the presence of a polar promoter, including, but not limited to, the promoter present during the ethylene polymerization step. Additional promoter can be added. Such promoters include but are not limited to diethers and/or diamines, such as diethylglyme andor TMEDA, cyclic ethers such as tetrahydrofuran, and any promoter known to be useful in anionic polymerizations. Preferably, this reaction is carried out at a temperature of from 30° C. to 120° C., the concentration of the cyclic siloxane monomer (described herein in terms of hexamethylcyclotrisiloxane) is from 1 to 80 percent by weight, and the amount of promoter used ranges from 100 ppm to essentially 100 percent by weight (i.e. the polar promoter is used as solvent). The reaction may be carried out at up to 80 weight percent solids, preferably 10 to 80 percent.

The living block copolymer can be recovered directly to give X-PDMS-O-Li (where X is a block of polystyrene or polyethylene; PDMS represents polydimethylsiloxane but other polysiloxanes could also be used instead) which is a living polymer and has not been terminated. Termination of the polymer may be achieved by several conventional means. It can be protonated with, e.g., acetic acid, to give X-PDMS-OH. It can also be coupled with, e.g., $SiCl_4$, $Me_2SiCl_2$, $HSi(OMe)_3$ with coupling agent functionalities from 2 to about 12 to give X-PDMS)$_n$, where n=the number of coupling agent functionalities. The coupling or capping reaction can be carried out from 40 to 100° C. for 5 minutes to 1 hour, preferably 70 to 100° C. for about 10 to 15 minutes.

The diblock copolymers of this invention have an overall weight average molecular weight of from 500 to 50,000, preferably from 1000 to 25,000. The copolymers should have a polysiloxane content of from 20 to 90, preferably 40 to 75, percent by weight because at lower amounts of polysiloxane this segment cannot express its lubricative effect on the substrate polymer. At higher polysiloxane contents one uses the anchoring effect of the diblock copolymer (i.e. polyethylene block or polystyrene block). If they contain polystyrene, the polysiloxane diblock copolymers have a polystyrene content (PSC) of 60 percent or less, preferably 30 percent or less, by weight, and the weight average molecular weights of the polystyrene blocks vary from 4000 to 30,000, preferably 4000 to 20,000. The polyethylene blocks, if present, have weight average molecular weights of from 500 to 10,000, and most preferably from 1000 to 5000. The weight average molecular weights of the polysiloxane blocks vary from 500 to 40,000, preferably 1000 to 20,000.

Preparation of the compositions of the present invention may be achieved by any convenient means. In most cases, it may be carried out by dispersing the diblock copolymer in the preformed organic polymer. In some cases, however, the diblock copolymer may be added prior to or during polymerization of the organic monomer to the polymeric state. As a further alternative, the diblock copolymer may be added during processing of the organic polymer or during compounding with other ingredients such as fillers, oil, and plasticizers.

The oils which can used herein are generally nonaromatic processing oils including softening oils, mineral oils, and extender oils. These oils will preferably have a flash temperature between 170° C. and 300° C. and a dynamic viscosity at 38° C. of about 20 to 500 cst. The amount of the processing oil required is preferably between 20 and 200, preferably 70, parts by weight and most preferably between about 25 and 50 parts by weight of the total composition per 100 parts by weight of the base polymer.

Compounds incorporating the composition of the present invention may also optionally include other components such as pigments, fillers, stabilizers, antioxidants, and anti-blocking agents. Such components are known to those skilled in the art. Fillers may comprise anywhere from a small amount up to a majority of the total composition. The other components are preferably present in an amount between 1 and 10 parts by weight per 100 parts by weight of the total composition.

EXAMPLES

Example 1

In this series of experiments, diblock copolymers of the present invention were added to a metallocene polyolefin polymer and a hydrogenated styrene-butadiene-styrene (SBS) block copolymer as a processing aid and were compared to prior art processing aids. The metallocene polyolefin polymer was EXACT® 4011 polymer which is a metallocene-based ethylene-butylene polymer made by Exxon Chemicals. The SBS block copolymer was a hydrogenated block copolymer of styrene and butadiene having a molecular weight of 67,000. One of the prior art processing aids was SILGRAFT® 250 (high molecular weight PDMS-g-PE made by UNICAR). The other was DOW CORNING® MB-004 silicone master batch which is a pelletized formulation containing 50 percent of an ultra high molecular weight silicone polymer dispersed in high impact polystyrene. The third prior art processing aid was a block copolymer of polyethylene and polystyrene wherein the polyethylene block molecular weight was 7000 and the polystyrene block molecular weight was 5000. This is comparative Polymer 1.

Two diblock copolymers within the scope of the present invention were used. The first, Polymer A, was a diblock copolymer with high density polyethylene and polydimethylsiloxane blocks wherein the polyethylene block molecular weight was 4000 and the polydimethylsiloxane block molecular weight was 9000. Polymer B was a polystyrene-polydimethylsiloxane diblock copolymer wherein each block had a molecular weight of 5000.

The blends of these materials were prepared by dissolving polymer mixtures in hot toluene, air drying in pans in a hood, and then vacuum drying overnight. The melt flow indexes of the polymers and the modified polymers were all determined at 250° C. and 5 kilograms according to ASTM D-1238. The results are shown in the following tables:

TABLE 1

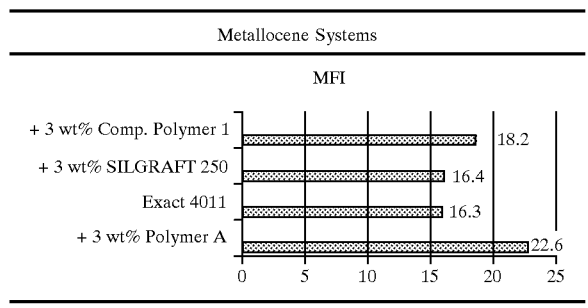

It can be seen in Table 1 that the melt flow index of the metallocene polymer containing the diblock copolymer of the present invention is 4.4 units higher than the polymer containing the better of the two prior art melt processing aids (about a 25 percent improvement). It can be seen in Table 2 that the addition of 3 weight percent of the diblock copolymers of the present invention results in a melt flow index (MFI) almost twice that of the polymer systems containing the prior art melt processing aids and almost a 300 percent improvement in the MFI of the SBS polymer itself. At 1 percent, Polymer B results in a melt flow index almost twice that of the prior art melt processing aids and greater than a 200 percent improvement of the SBS polymer with no processing additive.

Example 2

Polymer A from Example 1 was blended with two different SBS compounds. Compound 1 is a blend of 53%wt. styrene-butadiene-styrene block copolymer (unhydrogenated; molecular weight—111,000), 29%wt. extender oil (Shellflex 371 made by Shell Chemical Company), 10%wt. low density polyethylene, and 8%wt. polystyrene. Compound 2 is a blend of 43%wt. hydrogenated styrene-butadiene-styrene block copolymer (molecular weight—181,000), 43 percent extender oil 2 (Drakeol 34 made by Penreco), and 14%wt. polypropylene. The polyethylene was Attane® 4601 linear low density polyethylene from Dow Chemicals.

Polymer A was blended into these materials by dry addition to the matrix polymer (compounds were pre-blended and compounded into pellets) and tumble blended together as dry ingredients. This mixture was then fed into a Brabender mixing head over a 30 sec time frame. The torque of the mixing head was used as a measure of melt viscosity and processibility. The torque measurement was determined by waiting until the polymer or compound had achieved full flux as indicated by a level torque reading. The results are shown in Table 3 above.

TABLE 2

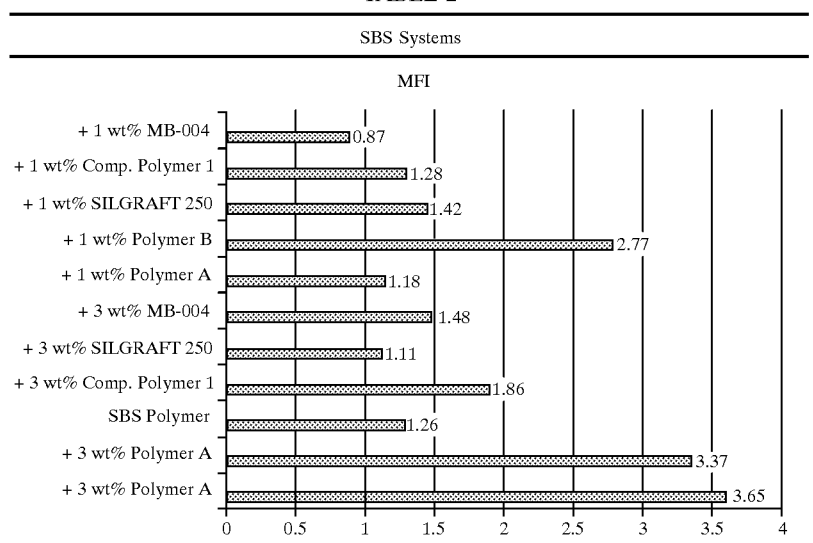

TABLE 3

| COMPOUND | PERCENT WEIGHT POLYMER A | BRABENDER DATA | | | MELT FLOW DATA | |
|---|---|---|---|---|---|---|
| | | SHEAR RATE RPM | TIME/TEMP | TORQUE | RUN CONDITIONS TEMP/LOAD WT | MFI (G/10 MIN) |
| Compound 1 | 0% | 75 | 2 min/160° C. | 5778 | 200° C./5 kg | 17.3 |
| Compound 1 | 0.5% | 75 | 2 min/160° C. | 3666 | 200° C./5 kg | 24.3 |
| Compound 1 | 1.5% | 75 | 2 min/160° C. | 4014 | 200° C./5 kg | 27.2 |
| Compound 2 | 0% | 75 | 2 min/235° C. | 2989 | 230° C./5 kg | 4.3 |
| Compound 2 | 0.5% | 75 | 2 min/235° C. | 2590 | 230° C./5 kg | 9.2 |
| Compound 2 | 1.5% | 75 | 2 min/235° C. | 2167 | 230° C./5 kg | 21 |
| Attane 4601 | 0% | 75 | 2 min/235° C. | 8354 | 200° C./5 kg | 3.6 |
| Attane 4601 | 0.5% | 75 | 2 min/235° C. | 5826 | 200° C./5 kg | 4.1 |
| Attane 4601 | 1.5% | 75 | 2 min/235° C. | 6256 | 200° C./5 kg | 3 |

It can be seen that in all cases, the addition of Polymer A to the compound or the polyethylene decreases the amount of torque that is required in the mixer. The melt flow index of Compounds 1 and 2 is dramatically increased by the addition of Polymer A. The addition of 0.5 weight percent of Polymer A to the polyethylene increases its melt flow index.

What is claimed is:

1. An organic polymer composition which comprises:
   (a) 100 parts by weight of a composition comprising a first organic polymer and from 0.1 to 5 percent by weight of a melt processing aid which is a diblock copolymer of polyethylene and a polysiloxane or a diblock copolymer of polystyrene and a polysiloxane wherein the diblock copolymer has an overall weight average molecular weight of from 500 to 50,000 and a polysiloxane polymer block content of from 20 to 90 percent by weight; and
   (b) from 8 to 50 parts by weight of a second organic polymer; and
   (c) from 20 to 200 parts by weight of an oil.

2. The composition of claim 1 wherein the first organic polymer is a block copolymer of a vinyl aromatic hydrocarbon and a conjugated diene.

3. The composition of claim 2 wherein the second organic polymer is selected from the group consisting of polyolefins, polyamides, polyethylene terephthalate, polyvinylchloride, polyvinylidenechloride, polystyrene, polymethracrylate, natural rubber, polyisoprene, butadiene-styrene random copolymers, butadiene acrylonitrile copolymers, polycarbonate, polyacetal, polyphenylenesulfide, cyclo-olefin copolymers, styrene-acrylonitrile copolymers, ABS, styrene-maleic anhydride copolymers, chloroprene polymers, isobutylene copolymers, cellulose acetate, and cellulose butyrate.

4. The composition of claim 1 wherein the overall weight average molecular weight of the diblock copolymer is from 1000 to 25,000.

5. The composition of claim 1 wherein the diblock copolymer is a copolymer of polyethylene and polydimethylsiloxane.

6. The composition of claim 1 wherein the diblock copolymer is a copolymer of polystyrene and polydimethylsiloxane.

7. The composition of claim 1 wherein the polysiloxane polymer block content is from 40 to 75 percent by weight.

8. An organic polymer composition, comprising:
   (a) 100 parts by weight of a composition comprising a first organic polymer and from 0.1 to 5 percent by weight of a melt processing aid which is a diblock copolymer of polyethylene and a polysiloxane or a diblock copolymer of polystyrene and a polysiloxane; and
   (b) from 8 to 50 parts by weight of a second organic polymer; and
   (c) from 20 to 200 parts by weight of an oil.

9. The composition of claim 8 wherein the first organic polymer is a block copolymer of a vinyl aromatic hydrocarbon and a conjugated diene.

10. The composition of claim 9 wherein the second organic polymer is selected from the group consisting of polyolefins, polyamides, polyethylene terephthalate, polyvinylchloride, polyvinylidenechloride, polystyrene, polymethracrylate, natural rubber, polyisoprene, butadiene-styrene random copolymers, butadiene acrylonitrile copolymers, polycarbonate, polyacetal, polyphenylenesulfide, cyclo-olefin copolymers, styrene-acrylonitrile copolymers, ABS, styrene-maleic anhydride copolymers, chloroprene polymers, isobutylene copolymers, cellulose acetate, and cellulose butyrate.

11. The composition of claim 8 wherein the overall weight average molecular weight of the diblock copolymer is from 1000 to 25,000.

12. The composition of claim 8 wherein the diblock copolymer is a copolymer of polyethylene and polydimethylsiloxane.

13. The composition of claim 8 wherein the diblock copolymer is a copolymer of polystyrene and polydimethylsiloxane.

14. The composition of claim 8 wherein the polysiloxane polymer block content is from 40 to 75 percent by weight.

* * * * *